June 4, 1929. J. TOMODA 1,715,725
COMBINED EGG CARRIER AND FEED BOX
Filed Feb. 23, 1928
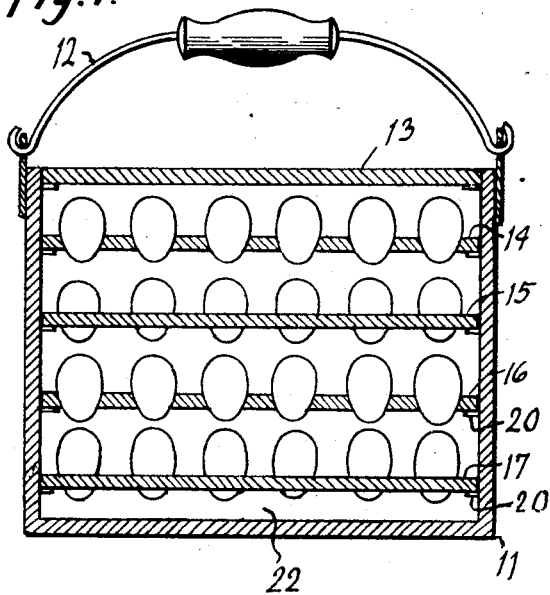
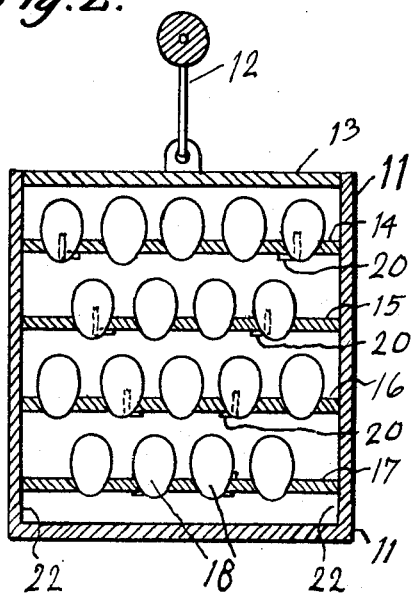
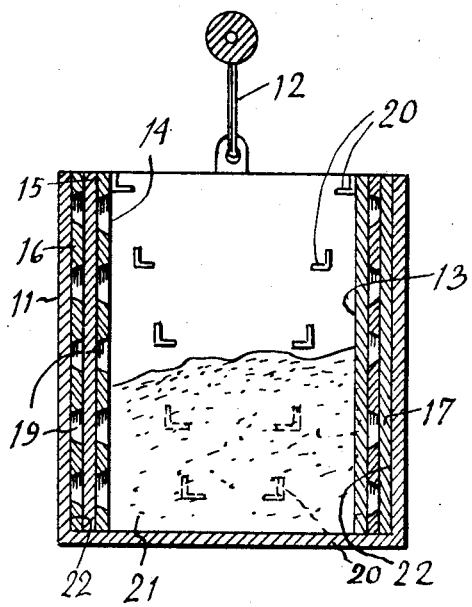
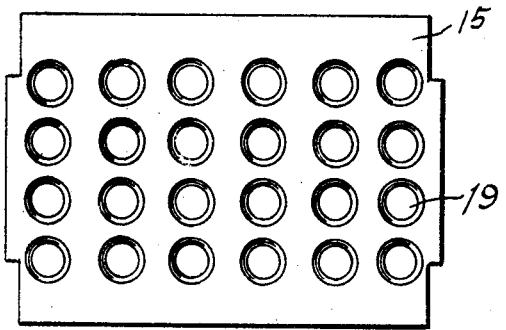
INVENTOR:
JICHIO TOMODA.
BY ATTY:

Patented June 4, 1929.

1,715,725

UNITED STATES PATENT OFFICE.

JICHIO TOMODA, OF LOS ANGELES, CALIFORNIA.

COMBINED EGG CARRIER AND FEED BOX.

Application filed February 23, 1928. Serial No. 256,288.

This invention relates to a new and improved egg carrier and feed box, and its objects are to provide a device of this character which will be useful in the care of poultry, domestic fowls, and all that are reared for their eggs, and to provide a carrier for the feed.

A practical embodiment of my invention is shown in the accompanying drawings, in which:

Figure 1 is a longitudinal and sectional elevation of my improved egg carrier. Fig. 2 is a transverse sectional view of the same. Fig. 3 is a transverse sectional view of the carrier as arranged for a feed receptacle. Fig. 4 is a fragmentary and perspective view of the partition members. Fig. 5 is a plan view of a partition member.

Referring to the drawings in detail, I provide a box 11, having the bail handle 12 for carrying the same, and having the top cover 13, and partition members 14, 15, 16 and 17. The several partition members are provided with holes 19 adapted to receive the eggs 18. The partition members are supported by projections 20, which maintain the partitions in spaced apart relation to one another, and support the eggs in a manner that will prevent the breaking of the same. Figs. 1 and 2, show the partition members positioned and holding the eggs.

To change the device for carrying feed 21, the partition members are positioned adjacent to the sides 22, of the box, as shown in Fig. 3. The uppermost supporting projections 20, serve to maintain the cover and partition members in position as shown.

The device is susceptible of modifications, changes and alterations without departing from the spirit of the invention, and I therefore do not wish to limit myself to the construction exhibited in the drawings, but reserve the right to make such minor changes as may fall within the scope of the appended claim.

It may be noted that the supporting projections 20, are disposed a less distance apart as they approach the bottom of the box. This facilitates the placing of them within the box.

What is claimed is:

A device of the character described, comprising a receptacle box, a bail handle attached thereto, supporting projections on the inner end walls of the box, the said projections being successively a less distance apart as they approach the bottom of the box, a cover mounted on the uppermost supporting projections, and egg-carrying partition members mounted on the remaining supporting projections, the said uppermost projections serving to support the partition members adjacent to the side walls of the box in the feed carrying position.

In testimony whereof, I hereunto affix my signature.

JICHIO TOMODA.